No. 851,976. PATENTED APR. 30, 1907.
A. O. BENECKE.
ELECTRICAL MEASURING INSTRUMENT.
APPLICATION FILED SEPT. 19, 1902. RENEWED APR. 1, 1907.
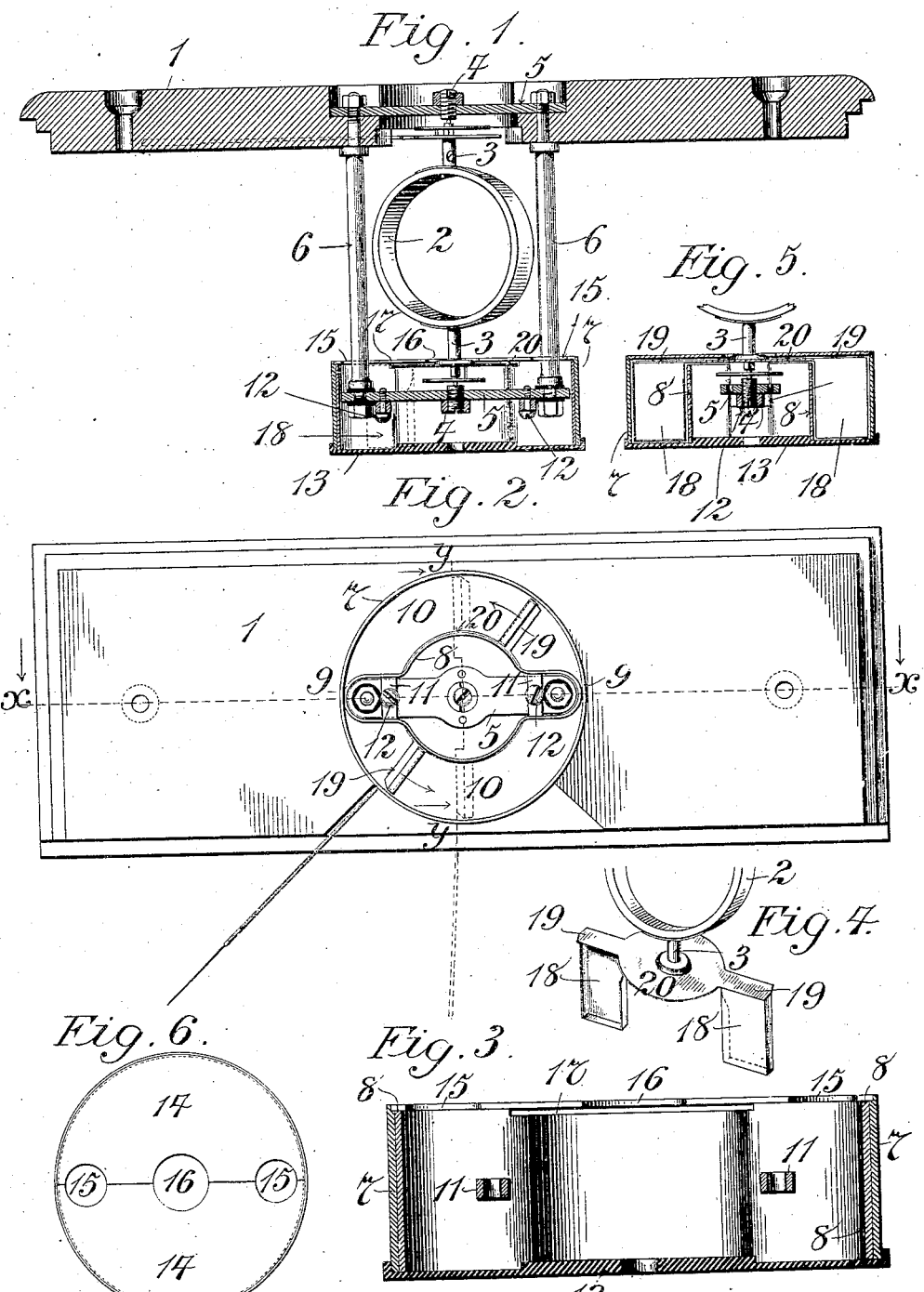
Witnesses
Edward C. Rowland
M. F. Keating
Inventor
Adelbert O. Benecke
By his Attorney
Charles J. Kintner

UNITED STATES PATENT OFFICE.

ADELBERT O. BENECKE, OF VAILSBURG, NEW JERSEY.

ELECTRICAL MEASURING INSTRUMENT.

No. 851,976.    Specification of Letters Patent.    Patented April 30, 1907.

Application filed September 19, 1902. Renewed April 1, 1907. Serial No. 365,861.

*To all whom it may concern:*

Be it known that I, ADELBERT O. BENECKE, a subject of the German Emperor, residing at Vailsburg, county of Essex, and State of New Jersey, have made a new and useful Invention in Electrical Measuring Instruments, of which the following is a specification.

My invention is directed particularly to an improvement in dampening devices for the movable parts of such instruments, for the purpose of effecting a "dead beat" action upon the index needle or pointer when the instrument is connected in circuit with a source of electrical energy, and to this end it consists in the structural apparatus hereinafter described and illustrated in the accompanying drawings, the especial points of novelty being particularly pointed out in the claims at the end of the specification.

For a full and clear understanding of the improvement such as will enable others skilled in the art to construct and apply the same to electrical measuring instruments, reference is had to the drawings, in which, Figure 1 represents a sectional view taken through the top of the casing of an instrument illustrating my improvement as attached to the movable or rotary part thereof, the movable coil, its supporting pivots and the sustaining pillars or posts for the "movement" being shown in elevational view. Fig. 2 is a plan view of Fig. 1 as seen looking thereat from the bottom toward the top of the drawings, the lower cover or cap being removed for the purpose of showing the internal structure of my improvement. Fig. 3 is an enlarged sectional view taken through that portion of the instrument embodying my improvement, and on the line $x$—$x$ Fig. 2, and as seen looking thereat from the top toward the bottom of the drawings, the retarding vanes and attached parts of the "movement" however, not being shown in this view. Fig. 4 is a perspective view illustrating the retarding vanes attached to the rotary or movable part of the instrument. Fig. 5 is a sectional view taken through that portion of the instrument embodying my improvement, and on the broken line $y$—$y$ Fig. 2 and as seen looking thereat from left to right in the direction of the arrows, a part of the movable coil being also shown. Fig. 6 is a plan view of the two part cover or cap which incloses the retarding vanes in the double or duplex air chamber.

In the use of electrical measuring instruments, when the instrument is connected in circuit with a source of electrical energy for the purpose of obtaining definite indications as to current quantity, current pressure, or the amount of energy being absorbed, it is important that the indicating needle be rendered "dead beat" in its action so as to give an instantaneous indication of the factor it is sought to obtain. Prior to my invention various types of dampers were devised for effecting this result, some of which are made dependent upon magnetic influences between the rotary coil of the instrument and the field magnets thereof, such for instance as are utilized in the well known Weston instruments in which the coil is wound upon a light spool of aluminium, the inductive effect of the current and the permanent magnetic field in such instruments tending to cause such dead-beat action. Such instruments, however, are not adapted to give the best results when used in connection with alternating currents for reasons well understood by those skilled in the art. In measuring instruments adapted for use in connection with such currents it therefore becomes necessary to depend upon other devices for effecting the dead-beat result. Recognizing this fact, therefore, inventors have heretofore attempted to produce a dead-beat action in such instruments, by one or more vanes or fans carried by the index needle or pointer and exerting a dampening or retarding influence by displacing the air within the casing of the instrument. To effect any substantial dead-beat action with such a dampening device, however, a vane or fan of relatively large area and hence of considerable mass is required which necessarily increases the momentum of the moving part and, therefore, materially affects the accuracy of the indications of the instrument. Instruments have also been constructed prior to my invention in which the retarding or damening influence is effected by a curved dashpot secured within the casing and a hollow or tubular curved plunger carried at one end of the needle, as disclosed in British Patent No. 12,074 granted July 4th, 1900 to Siemens Bros. Company, Ltd. Such an instrument, however, requires one or more counterweights for counterbalancing the weight of the plunger carried by the needle. An instrument made in accordance with the specification of British Patent No. 12,074 will, owing to the peculiar construction of the dash-pot, tend to give a fairly good dead-beat action, but owing to the masses of the parts carried by the movable part of the "movement" and the unsymmetrical location of said masses with relation to the axis of rotation there result elements of error which more than compensate for the dead-beat effect of the dash-pot, so that although the needle gives an approximate dead-beat indication the instrument has not given an actual indication of the true current reading. Still further attempts have been made more closely approximating my improvement in which two vanes or fans, or the equivalents thereof, are secured directly to the axis of the rotary index needle or pointer and are inclosed in a double or duplex surrounding chamber, as disclosed in U. S. Patent to Edward Weston No. 433,637, granted Aug. 5th, 1890, and U. S. Patent to Kennally No. 500,236, granted June 27th, 1893. A further attempt has been made in this direction also, as disclosed in U. S. Patent to Knowles No. 520,964, of June 5th, 1894. None of these devices, however, disclosed in the above-named patents are adapted to produce an absolute dead-beat effect under the best possible conditions. The invention disclosed in British Patent No. 12,074 above referred to approaches nearer to such a result.

In the construction of an electrical measuring instrument, so that it may give the best results as to the actual measurement of the current flowing through the operative coil or coils, it is important that the needle shall settle at the limit of its throw or range at the instant that it is connected in circuit with a source of electrical energy, and that it shall thereafter give instantaneous dead-beat indications of any change whatever of current flow. To effect this, therefore, it is especially essential, first, that the mass of the combined moving parts of the "movement" shall be relatively small; second, that the mass of the dampening device carried by the moving part of the "movement" shall be symmetrically disposed with relation to the axis of rotation of said part so as to thereby avoid the use of any counter-balances whatever; third, that the mass of the dampening device shall be as near the center of rotation of the movable part as possible; and, fourth, that the mass of the dampening device, when designed so as to displace a volume of air, shall be so shaped and arranged as to cause a maximum displacement thereof with a relatively low rate of flow.

In constructing a retarding device embodying the essential principles of my invention it is also important that the clearance between the lateral edges of the vanes or fans and the interior walls of the air chambers be such that there shall be no possibility of any mechanical contact between the vanes and said walls. If the areas of the vanes and the interior diameters of the duplex air chambers are large the clearance may be relatively large and the turned out edges of the vanes may be correspondingly diminished, or even done away with. But, as before pointed out, to increase the areas of the vanes is to increase the momentum of the moving parts and to decrease the same, unless the edges be turned outward in opposite directions, is to increase the air flow to such an extent that when said vanes assume a practical size a device is produced which does not effect a dead-beat action. I have ascertained by a long series of carefully conducted experiments that practical results of a dead-beat nature with such a device can only be obtained when the area of the vanes and the diameters of the combined air chambers are relatively small, the vanes being so constructed that the outflow of air is small compared to the volume of air acted upon by them and the confining air chambers. In other words, with a safe clearance the area of the vanes and the volume of the air chambers being small the depths of the cups or the depths of their out-turned edges will determine the perfect acting retarding device. I have obtained most excellent results with a device connected in accordance with Figs. 1, 2, 3 and 4 and upon the scale therein indicated, said figures having been made directly from a working damper and applied to a Weston instrument of the alternating current type. My improvement embraces all of these essential qualifications.

Referring now to the drawings in detail and first to Fig. 1, 1 represents that part of the casing of an electrical measuring instrument which supports the "movement" embracing the rotary coil, index needle and interconnected parts removable therefrom as a unit. 2 represents the rotary or movable coil and 3, 3, the pivots therefor, said pivots being attached directly to the coil and supplied with the usual jewel bearings 4, 4, carried by bridges 5, 5, secured at their opposite ends to supporting pillars or posts 6, 6, the usual coiled springs or springs electrically connected with the coil being shown; said parts as described so far constituting what is known as the "movement" and being not substantially different from the like parts found in the well known Weston electrical measuring instruments described and shown in numerous U. S. patents heretofore granted to Edward Weston, of Newark, N. J.

The usual field magnet coils or permanent magnets, as the case may be, are not shown, for the reason that their application is at once obvious, my improvement being, as above indicated, directed solely to novel means for effecting a "dead beat" action upon the index needle carried or supported by the rotary or movable element illustrated in Fig. 2 of the drawings.

My improvement embodies a double or duplex air chamber 10, 10 constructed preferably of a cylindrical outer metallic part 7 and an interior or concentric structure 8 (partly cylindrical and partly approximately elliptical) the outer or approximately elliptical ends being brazed or soldered at 9, 9, to the inner wall of the part 7, so that the two air chambers 10, 10 are located on opposite sides, the elliptical ends being such that they will permit of the insertion of the free ends of the sustaining pillars or posts 6, 6, and the lower bridge 5 into the inner concentric chamber and in the position shown in Figs. 1, 2 and 5.

11, 11 are short cross-bars brazed or otherwise secured to the inner surfaces of the elliptical ends and 12, 12 screws passing upward through said cross-bars and into the lower bridge 5, such an arrangement making my improvement readily applicable to the well known Weston electrical instruments as they are at present being placed upon the market.

Referring now to Fig. 4, 20 represents a thin disk, 19, 19 arms and 18, 18 vanes or fans, said parts being all stamped or formed in one thin integral piece from aluminium with the lateral edges of the two vanes turned outward in opposite directions to form forwardly directed marginal flanges, as shown. These parts constitute a double or duplex vane or fan attached directly to the lower pivot 3 which supports the movable coil 2 and the structural arrangement is such that when the vanes are in position within the individual compartments of the duplex air chamber 10, 10, the disk 20 will fit, without frictional contact, in a slotted opening 17 (see Fig. 3) between the upper edge of the inner part of the chamber and the cover 14 therefor, said cover being constructed in two parts, as clearly shown in Fig. 6, and so devised that when the parts are put together there are three openings, 15, 15, and 16 for the pillars or posts 6, 6, and the pivot 3. 13 is a bottom cap for the lower end of the duplex air chamber, said cap being made preferably of non conducting material, as hard rubber, for the purpose of avoiding the evil effects of Foucault currents.

The parts are assembled as follows—The delicate vanes or fans 18, 18 with their sustaining arms 19, 19 and disk 20 are secured directly to the lower pivot 3 and the coil and attached parts are placed in the position shown in Fig. 1, after which the lower bridge 5 is secured in place in the usual manner with the lower pivot resting upon its jewel bearing 4. The duplex air chamber is then placed in position with the elliptical ends of the inner part 8 surrounding the ends of the lower bridge. The screws 12, 12 are then passed through holes in the cross-bars 11 and secured directly to the bridge 5. The two parts of the cover 14 are then slipped into position in a groove in the upper face of the outer cylindrical part 7, being held therein very much in the same manner that a watch crystal is held by the bezel thereof. The lower cap 13 is then secured in position and the entire "movement" is ready to be placed in the field of the energizing coils or magnets not shown, but well understood.

It will be obvious on inspection of Figs. 1, 3, 4 and 5 that inasmuch as the disk 20 practically closes the entire slotted opening 17 between the upper edge of the cylindrical portion of the inner part 8 and the cover 14, the duplex air chambers 10, 10 will retain the air therein with the best possible effects, it being apparent that as the vanes are rotated in the direction of the arrows shown in Fig. 2 and inasmuch as the lateral edges thereof are turned outward in opposite directions so as to form cups, the best compressive or checking effects upon the confined air will at all times be had, so that no matter what may be the magnetizing effects upon the movable coil 2 the needle of the instrument will settle instantly when it reaches the extreme limit of the throw thereof.

My improvement embodying as it does the double or duplex air chamber with a double or duplex vane or fan located therein, the same being constructed of very light material such as aluminium and with the outer edges of both vanes turned inward and in opposite directions and relatively close to the inner walls of the chambers together with the light metal disk 20 closing the slotted opening 17, is such that when the needle and moving parts attached thereto are caused to move there will be a maximum displacement of air at all times with a relatively low rate of flow, so that the needle will always give an absolutely dead-beat effect, and this feature constitutes the essence of my invention. Although I have described my invention as having an especial adaptability for use in connection with alternating current electrical measuring instruments, I do not limit it to that type of instruments, as obviously it may be adapted to electrical measuring instruments generally, and my claims hereinafter made are designed to be of such scope as to include all such uses.

I believe it is broadly new with me to produce an air dampening device for use with instruments of precision having vibratory needles in which the dampening effect upon the needle is absolutely dead-beat, and is produced by so locating the parts of the damper, vane or fan that the momentum attributable to said damper, vane or fan is practically *nil* and to so construct and arrange the vane or fan within the air chamber that it will always displace a maximum volume of air with a relatively low rate of flow thereof, and my claims are to be construed as generic in this particular, such a result, so far as I am aware, never before having been accomplished prior to my invention.

Having thus described my invention what I claim and desire to secure by Letters Patent of the United States is—

1. A retarding device for the movable part of an electrical measuring instrument, the same consisting of a duplex air chamber and a two part vane or fan located therein, said vane or fan being constructed with the lateral edges of each part thereof turned outward in opposite directions to form forwardly directed marginal flanges.

2. A retarding device for the movable part of an electrical measuring instrument, the same consisting of a double or duplex air chamber and a two-part rotatory vane located therein, said vane being symmetrically disposed with relation to the location of the movable part and with the lateral edges of each part of said vane turned outward in opposite directions to form forwardly directed marginal flanges.

3. In an electrical measuring instrument, the combination of a movable part thereof with a retarding device for said movable part, said device embracing an air chamber having a slotted opening and a vane or fan located in said chamber, said vane or fan being attached to said movable part by a disk which closes the upper end of the air chamber and the slotted opening, so that the contained air in the chamber is held in check when the vane is moved, substantially as described.

4. In an electrical measuring instrument, the combination of a movable part thereof with a retarding device for said movable part, said device embracing two vanes or fans oppositely disposed with relation to the axis of said movable part, each of said vanes or fans being located in an air chamber and connected to the movable part of the instrument by a disk which holds the air in check when the vanes are moved, substantially as described.

5. In an electrical measuring instrument, the combination of a movable part thereof with a retarding device for said movable part, said device embracing an air chamber; a vane or fan located therein and operatively connected to said movable part, and a rotatable disk adapted to hold the air contained within the chamber in check when the vane is moved, substantially as described.

6. An electrical measuring instrument provided with a movable part and supporting posts or pillars therefor, in combination with a retarding device detachably secured to said posts or pillars, said device comprising a duplex air chamber, a duplex vane or fan secured to said movable part by means of a disk integral with said vane or fan, the individual parts of said vane or fan being inclosed in the individual compartments of said air chamber.

7. A retarding device for an electrical measuring instrument embracing an air chamber and a vane or fan inclosed therein, said vane or fan being provided with forwardly directed marginal flanges and with means for connecting it to the movable part of an electrical measuring instrument and the cross-section of the air chamber and the area of the vane being relatively such that the outflow of the air under pressure from the vane bears a substantially constant relation to the torque applied to the movable part of the instrument, substantially as described.

8. A retarding device for an electrical measuring instrument having a rotary or movable part, said device consisting of an air chamber, a vane located therein and attached to the rotary or movable part of the instrument, pillars secured to the body of the instrument, bridges mounted upon said pillars for carrying the rotary or movable part of the instrument and means for detachably securing said air chamber to one of said bridges.

9. An electrical measuring instrument provided with two bridges or pivot supports which carry the usual jewel bearings pillars or posts attached directly to the casing for supporting said bridges or pivot supports; in combination with a dampening device embracing an air chamber and a vane inclosed therein and attached to the pivoted movable part of the instrument; together with means for detachably securing said dampening device as a whole to one of said bridges, substantially as described.

10. A retarding device for electrical measuring instruments, combined with a rotatable part of said instrument said device comprising an air chamber, a vane inclosed within said chamber and secured to said rotatable part to move therewith, said vane being provided with forwardly directed marginal flanges.

In testimony whereof I have signed my name to this specification in the presence of two subscribing witnesses.

ADELBERT O. BENECKE.

Witnesses:
W. H. YAWGA,
EDW. F. WESTON.